Feb. 27, 1973 J. POSTOLOWSKI Re. 27,585

DEVICES FOR DISPENSING TINSEL AND THE LIKE ADAPTABLE FOR DECORATING CHRISTMAS TREES

Original Filed March 8, 1968 2 Sheets-Sheet 1

INVENTOR,
John Postolowski,

BY

ATTORNEY.

FIG.8
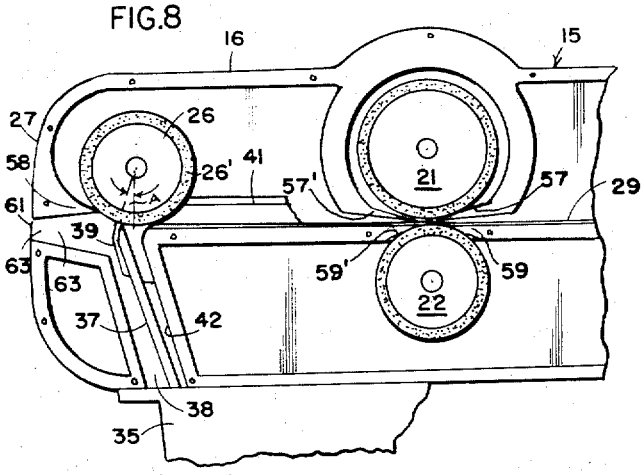
FIG.9
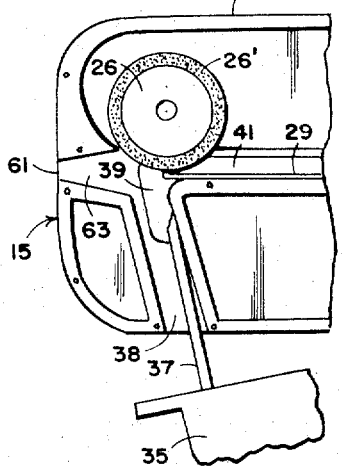
FIG.12
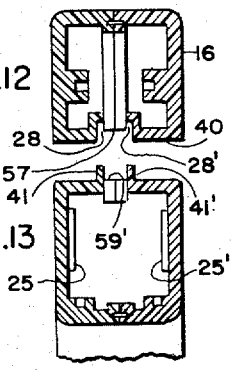
FIG.13
FIG.10
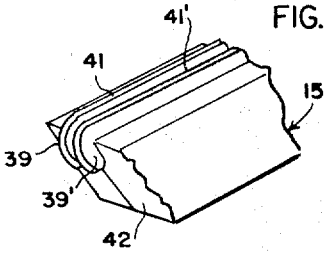
FIG.11
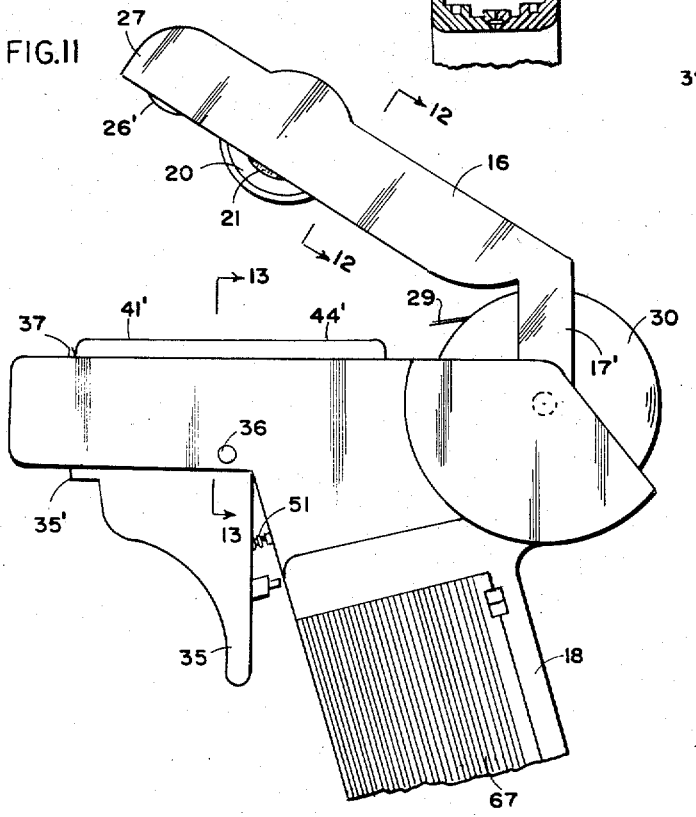
FIG.14
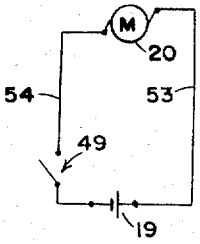
INVENTOR,
John Postolowski,
BY
ATTORNEY.

United States Patent Office

Re. 27,585
Reissued Feb. 27, 1973

27,585

DEVICES FOR DISPENSING TINSEL AND THE LIKE ADAPTABLE FOR DECORATING CHRISTMAS TREES

John Postolowski, 45—12 163rd St., Flushing, N.Y. 11358

Original No. 3,494,235, dated Feb. 10, 1970, Ser. No. 711,603, Mar. 8, 1968. Application for reissue Sept. 23, 1971, Ser. No. 183,095

Int. Cl. B26d *5/20*

U.S. Cl. 83—225 9 Claims

Matter enclosed in heavy brackets [ ] appears in the original patent but forms no part of this reissue specification; matter printed in italics indicates the additions made by reissue.

ABSTRACT OF THE DISCLOSURE

Upon the pressing of a spring-biased element which may be the trigger of a gun-shape, tinsel issues through the muzzle from off a supply roll mounted at the stock. The upper part of the barrel of the gun is movable to allow the tinsel to be threaded by being laid in a track which keeps it from getting caught in its passage to discharge end and also guide the cut-off blade. The stock houses a dry cell to power a miniature electric motor driving nippling rollers. The trigger controls a switch in the motor circuit. Near muzzle end, there is an idler roller which is normally engaged by the cut-off blade carried by the trigger. At cut off, said blade automatically shifts said idler to free the new lead end of the tinsel.

The present invention relates to dispensing devices for tinsel and the like, to decorate Christmas trees.

An object of this invention is to provide a novel and improved dispensing device to be held in hand and manipulated to issue forth any desired length of tinsel and the like, from off a supply roll.

Another object thereof is to provide a novel and improved dispensing device of the character mentioned, in which operation of the cut-off means automatically frees the lead end of the tinsel from the cutting blade, so that upon retraction of said blade to its normal rest position, the tinsel will not be drawn from its prescribed path.

A further object is to provide a track through the device for the tinsel to ride in and be free from being caught in its movement therealong, and to guide the blade.

Another object thereof is to have the frame of the dispensing device in the form of a gun, the operation of whose trigger will effect tinsel propulsion by closing the circuit of a miniature electric motor driving nipping rollers, and upon release of the trigger will open the motor circuit and cause cut-off of the tinsel.

A further object is to provide for easy threading of the tinsel through the divice.

Still a further object is to provide a tinsel dispensing device of the character described, which is simple in construction, reasonable in cost to manufacture, easy to use, and efficient in carrying out the purposes for which it is designed.

Other objects and advantages will become apparent as this disclosure proceeds.

For one practice of this invention, the frame of the device may be in the form of a gun. Upon pressing the trigger tinsel is discharged through the muzzle from off a supply roll mounted on the stock. The upper part of the gun's barrel is a separate piece swingably mounted at its rear end, and when swung upward, allows the tinsel to be threaded by being laid in a track on the lower part of the gun. The stock houses a dry cell to power a miniature electric motor arranged to drive a nippling roller on the swingable gun part, which roller, when the gun is "closed," contacts its companion roller on the lower gun part. A releasable catch holds the said gun parts in operative assembly. Near muzzle end, there is a rubber covered idler roller, which is normally engaged by a forwardly upwardly inclined cut-off blade having some resilient quality and carried by the trigger. At cut-off, said blade automatically shifts said idler to free the new lead end of the tinsel therefrom. The trigger controls a switch in the motor circuit. Stripper means are provided at all rollers. The track is of a construction which keeps the tinsel from getting caught in its passage therealong, and also serves to guide the cut-off blade.

In the accompanying drawings forming part of this specification, similar characters of reference indicate corresponding parts in all the views.

FIG. 1 is the front view of a tinsel-dispensing device embodying the teachings of this invention, shown in the form of a gun which is a preferred embodiment thereof, hence, this view is looking at muzzle end. The gun casing is made of two halves, one right and the other left, which are secured together; their parting being in a substantially central vertical plane. The barrel's upper part is separate, and is swingably mounted to facilitate threading the tinsel which comes off a supply roll positioned above the stock.

FIG. 8 is an enlarged fragment of FIG. 2, showing the tinsel feeding and cut-off stations, as well as other incidents of structure which will be explained.

FIG. 9 is an enlarged fragment of FIG. 2, showing the cut-off station and indicating "shoot" position of the trigger and the cut-off blade it carries.

FIG. 10 is a fragmentary perspective view showing the forward ends of the rails which form part of the tunnel guide for the tinsel; said rails being on the roof wall of the lower part of the barrel of the gun casing.

FIG. 11 is a side elevation of the gun, showing the separate upper part of the barrel swung upwardly so the tinsel can be threaded.

FIG. 12 is a section taken at line 12—12 in FIG. 11, (or at 4—4 in FIG. 2), omitting the upper roller which is driven by the electric motor provided herein.

FIG. 13 is a section taken at line 13—13 in FIG. 11, (or at 4—4 in FIG. 2), omitting the lower roller.

FIGS. 3–6, 10, 12 and 13, are drawn to a slightly enlarged scale as compared to the scales of FIGS. 1 and 2.

FIG. 14 is a wiring diagram of the motor circuit.

Figure 1:
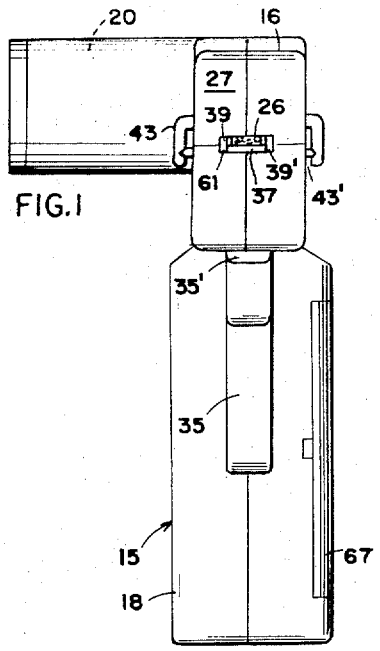
Figure 2:
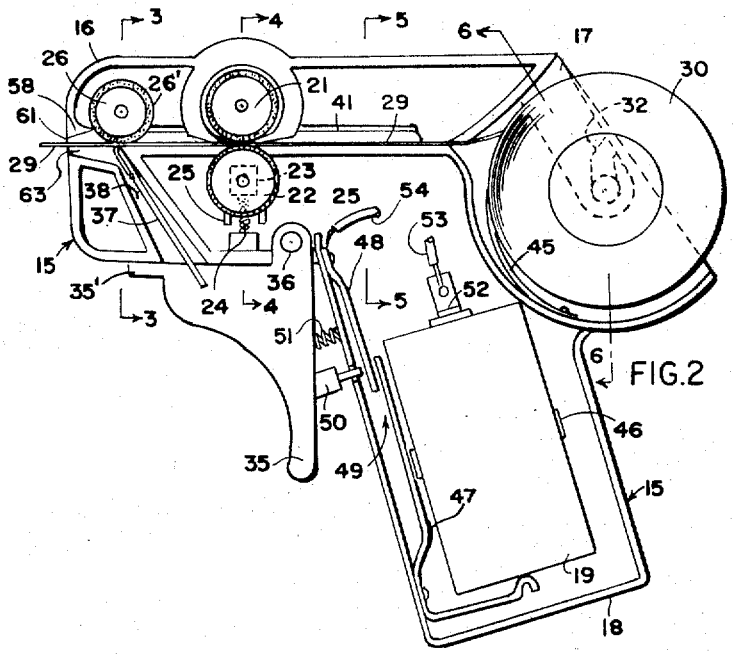
FIG. 2 is a side view of the left half of the device, showing the gun in normal rest condition, loaded and ready to "shoot" tinsel upon operation of the trigger. The blade to sever the tinsel, is at cut-off position.
Figure 3:
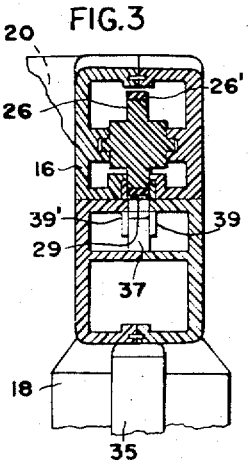
FIG. 3 is a section taken at line 3—3 in FIG. 2, showing cut-off station.
Figure 4:
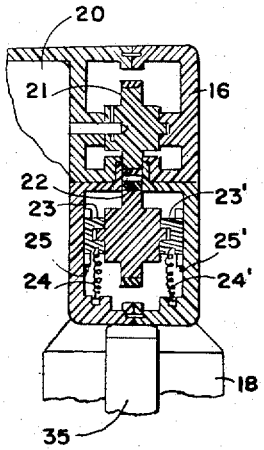
FIG. 4 is a section taken at line 4—4 in FIG. 2, showing the nipping rollers which feed the tinsel through the gun.
Figure 5:
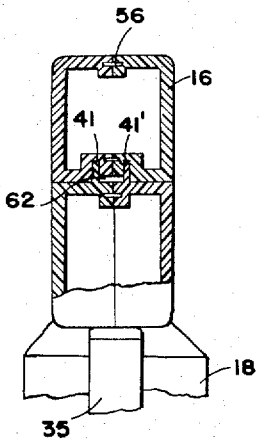
FIG. 5 is a section taken at line 5—5 in FIG. 2, showing the tunnel track provided for the passage of the tinsel. Tinsel is omitted, to attain clarity of illustration.
Figure 6:
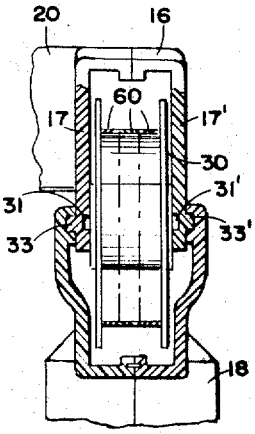
FIG. 6 is a section taken at line 6—6 in FIG. 2 showing the tinsel supply spool and its mounting.
Figure 7:
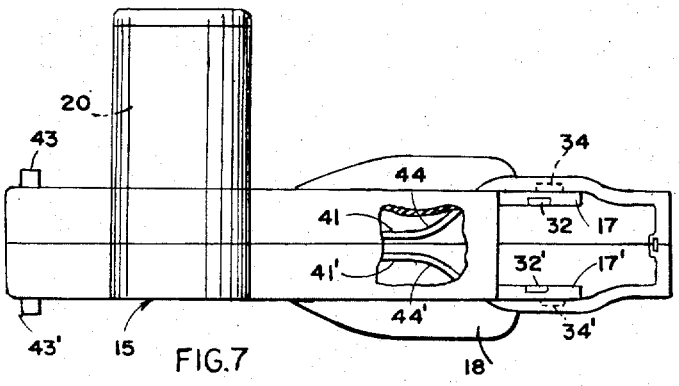
FIG. 7 is a top plan view of the gun of FIGS. 1 and 2, with a part broken away to expose the track.

In the drawings, the casing of the dispensing device may be of any suitable form, but is here chosen to be a gun-shape indicated generally by the numeral 15, which is a preferred embodiment, and so "gun" nomenclature will be resorted to for indicating parts of such casing which correspond to ordinary gun regions. The upper portion of the barrel denoted generally as 16, is a separate part having downwardly slanting side arms 17, 17' extending from the rear thereof to a region above and behind the hollow stock 18 which houses the dry cell 19 for actuating the minature electric motor 20 arranged to drive the upper nipping roller 21 journalled and housed in said upper part 16; said roller cooperating with its companion roller 22 which is journalled and housed in the lower part of the barrel on vertically slidable bearings 23, 23' biased by the compression springs 24, 24' which bearings ride in tracks 25, 25' respectively. Near muzzle end, a rubber-coated idler 26 is housed and journalled in said upper part 16. The motor 20 is mounted on a side of said part, which is tubular, open in the rear and closed by a wall 27 in front. The bottom wall 40 of said part 16, has two parallel channels 28, 28', spaced apart a bit more than the width of the tinsel 29 which comes off a supply spool 30 whose outward pintles 31, 31' fit into the opposite bent slots 32, 32' which are on the inner faces of the arms 17, 17' respectively. The pintles 33, 33' on the outer faces of said arms, rotate in sockets 34, 34' in opposite spaced walls extending from the lower part of the casing. Of course, all related pintles are in alignment respectively. The numeral 35 indicates the trigger pivoted at 36, from which upwardly forwardly extends the cutting blade 37, whose edge normally "bites" into the rubber sleeve 26' of the idler roller 26. Said blade lies in an opening 38, and is guided by the forward extensions 39, 39' of the rails 41, 41', which are downward on the wall 42; said rails fitting into the channels 28, 28' when the gun is "closed" in operative condition as in FIGS. 1 and 2, in which condition it is maintained by the releasable catches 43, 43'. The rearward ends of said rails are flared as shown at 44, 44', to guide the tinsel coming off the supply spool 30, which is equipped with a braking cantilever blade spring 45 which presses against the outer tinsel turn. The dry cell 19 is held releasably by a spring clamp 46, and rests contacting the arm of a mounted blade spring 47 which forms a switch 49 with the spaced blade 48, to control the motor circuit; the trigger 35 carrying a projection 50 which causes said springy elements 47 and 48 to make contact upon pressing said trigger which is biased to return to its normal rest position as shown in FIG. 2, by the compression coil spring 51. The carbon terminal of the cell is in contact with a spring blade piece 52, which is connected by a conductor 53 to one terminal of the motor 20, while a conductor 54 is connected to the other motor terminal. To assure good traction of the tinsel, the nipping rollers are also rubber covered.

The casing 15 is preferably moulded of plastic. The part 16 is of two halves, one right and one left, cemented and pinned together as shown at 56, the remainder of the casing is made in like manner, with the provision of a hinged door 67, to give access to the cell 19.

Frame structure encircling the rollers may provide strippers in the form of blades against them, as shown at 57, 57' for the roller 21, and at 58 for the idler 26, or stripping edges may be provided in the manner shown at 59, 59' for the roller 22, on the wall through which it passes in a suitable opening therefor provided.

The flared entrance afforded between the rails 41, 41' by the out-turned portions 44, 44', allows the use of a supply spool 30 on which each layer of tinsel comprises a coil of three adjacent turns as shown at 60, which is indicated as an example to give an ample supply per loading.

To load the gun, the tinsel-laden spool 30 is set so its pintles enter into the slots 32, 32', and the lead end of the tinsel, after swinging the part 16 upward as in FIG. 11, is laid between the rails 41, 41', and then is pulled forward to extend out of the discharge opening 61. Now the gun is closed by swinging the part 16 downward, whereupon the rails will be entered into the channels 28, 28' respectively, whereby the tinsel is housed in a tunnel 62, whose height is only a portion of the height of the rails 41, 41'. It is to be noted that there is no horizontal crack in the tunnel structure for a shifting tinsel to get caught in. It would have to bend at a tunnel corner along tunnel floor to get between a rail and the channel wall it is in. Such bending is highly improbable, so the passage of the tinsel is without a catch. The tunnel is maintained intact, because the part 16 is held tight due to the catches 43, 43' which lock the parts of the barrel.

To decorate a Christmas tree, or other branched article, with tinsel, the gun is held in hand and so positioned that tinsel will fall behind the branch. Upon pressing the trigger 35, the finger 50 will enter the hollow stock 18, which upon closing the switch 49, will cause the motor 20 to run. The tinsel being discharged will fall to one side of the branch. Then the device is lowered while tinsel continues to issue therefrom. This will direct the tinsel to fall on the other side of the branch, whereupon the tinsel piece dispensed will straddle the branch. Now releasing the trigger, the spring 51 will return it to its normal rest position, for its return movement will cease when the stop 35' *abuts* [comes to] the gun body as in FIG. 2.

When the trigger is pressed, the blade 37 will move away and become disengaged from the roller 26, giving as in FIG. 9, clearance for tinsel passage to the discharge opening 61, through the forwardly tapering nozzle 63 which serves to guide the tinsel outwardly of the muzzle. When the trigger is released, the motor 20 will of course stop because the blades 47 and 48 constituting the switch 49, will separate and thus open the motor circuit, and the blade 37 will snip the tinsel, and its edge will bite into the rubber sleeve 26' covering the idler toner 26 before the trigger has fully returned to rest position. The little movement of the blade from cutting position to final rest position, will cause the said idler to turn a bit as indicated in FIG. 8 by the angle A, thus releasing its contact with the lead end of the tinsel, because the knife edge is now spaced forwardly thereof as is shown in said FIG. 8. It is evident that the tinsel is freed from any tendency to follow the blade when the trigger is pulled, and is free for discharge. In this normal rest position, the blade 37 will be bent a little and stressed. The spring 51 being strong enough to do this until rest 35' contacts the casing.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description and showing herein, to indicate the scope of this invention.

I claim:

1. In a device for dispensing tinsel or the like from [off] an endless supply of such material, a frame presenting mounting means for said supply, an idler roller [having a resilient periphery,] rotatably mounted on the frame near an end thereof, nipping rollers rotatably mounted on the frame, for feeding said material lengthwise from the supply toward said idler *roller,* guide means on the frame to direct the fed supply from the nipping rollers so that it contacts the periphery of the idler roller, a cut-off blade [having some resilient quality, biting into] *engaging* the periphery of said idler roller at a position [slightly in advance of the place on the roller] where said fed supply contacts the idler roller, [said position being between said place and said end of the frame; said blade being in flexed condition, adapted when moved from the idler roller, to return to a rest position from which when returned to the idler roller will engage such idler roller at the place mentioned;] the axes of all rollers being parallel, and the axis of said idler roller being parallel to and away from the plane of the blade, an electric motor for driving said nipping rollers, a circuit for actuating said motor, a normally open switch having an operating member, interposed in said circuit to control the operation of said motor; said blade extending from said operating member; said operating member being movably mounted on said frame; said operating member being arranged so that when it is moved to close said switch, the blade will move away from the idler roller in a direction *substantially* normal to the axis of said idler roller, and upon movement of said operating member back to its position where the switch is opened, the blade will cut off the material and reengage the idler roller [at said place and become flexed while it turns said idler roller slightly in the direction the material and its movement would turn said idler roller].

2. A device as defined in claim 1, including spring means biasing said operating member to its position where the switch is in open condition and the blade is returned to its said [advanced] position [and flexed condition] *engaging the idler roller.*

3. A device as defined in claim 1, wherein the frame is a casing having a discharge opening at said end, and including a second guide means to direct material passing the idler roller to said opening; said roller being housed in said casing.

4. A device as defined in claim 3, wherein the casing comprises separate upper and lower parts, and including means releasably holding said parts in assembly, the supply means being on one of said parts; one of said nipping rollers being on one of said parts respectively; said upper part having a bottom wall provided with an opening through which the lower portion of the upper nipping roller extends; the lower casing part having a top wall with an opening therethrough, through which the upper portion of the lower nipping roller extends; said nipping rollers being intermediate said supply mounting means and the idler roller, a pair of spaced parallel rails along and extending upwardly from the top wall of the bottom casing part; the bottom wall of the upper casing part having spaced parallel channels; said rails fitting into said channels respectively; that part of the lower wall which is between said rails, being spaced from that part of the said upper wall which is between the channels, whereby a tunnel is formed for passage of said material; that part of the tunnel which is between the nipping roller and the idler roller, constituting the first guide means.

5. A device as defined in claim 4, wherein the ends of the rails which are nearest the supply mounting means, are divergent towards said means.

6. A device as defined in claim 4, wherein the lower casing part is provided with a downward opening therethrough; the blade being in said opening; said opening having a flat wall opposite the face of the blade which is nearest the nipping rollers; the ends of the rails nearest the idler roller, extending downwardly on such rear wall; said blade being slidably fitted between said downward extensions.

7. A device as defined in claim 1, wherein the frame is a gun-shaped casing having a hollow stock, a barrel and a movably mounted trigger; the discharge opening being through the muzzle end of the gun-shape; the supply mounting means being over the stock; the upper part of the barrel being one of the separate parts and movably mounted on the lower part; the trigger constituting the switch operating member.

8. A device as defined in claim 7, including spring means biasing said trigger to its position when the switch is in open condition and the blade is returned to its said advanced position and flexed condition.

*9. A device for dispensing any desired length of a strip of material comprising:*

*a gun-shaped frame having a stock portion and a barrel portion, said stock portion being adapted to be held by the hand of an operator;*

*a supply reel containing a supply of said strip material being rotatably mounted in the rear of said barrel portion;*

*an idler roller being rotatably mounted at the forward end of said barrel portion;*

*a pair of nipping rollers being rotatably mounted in said barrel portion between said supply reel and said idler roller for feeding said material lengthwise from said supply reel toward said idler;*

*said barrel portion including guide means for directing the fed supply from said nipping rollers toward said idler roller so as to engage the periphery of the idler roller;*

*a trigger assembly pivotally mounted to said gun-shaped frame;*

*a cut-off blade secured to the forward end of said trigger assembly;*

*said trigger assembly including bias means engaging said gun-shaped frame for normally urging said trigger assembly toward a rest position with said blade engaging the periphery of said idler roller;*

*motor means for driving said nipping rollers;*

*means for energizing said motor;*

*normally open switch means coupled between said actuating means and said motor and having a movable switch arm operative under control of said trigger assembly whereby said switch arm is in a first open position disconnecting said energizing means from said motor when said trigger assembly is in the rest position and a second position electrically coupling said energizing means to said motor when said trigger assembly is operated against said bias means away from said rest position whereby said cut-off blade is moved away from said idler roller when said motor drives the nipping rollers and whereby said motor means is deactivated and said cut-off blade is moved toward engagement with said idler roller to sever the strip material upon deactivation of said motor means.*

References Cited

The following references, cited by the Examiner, are of record in the patented file of this patent or the original patent.

UNITED STATES PATENTS

| | | | |
|---|---|---|---|
| 3,037,477 | 6/1962 | Krueger et al. | 83—649 X |
| 3,386,634 | 6/1968 | Curry | 83—649 X |
| 2,634,877 | 4/1953 | Kaplan | 83—586 X |
| 3,035,345 | 5/1962 | Barnard | 83—649 X |

FRANK T. YOST, Primary Examiner

U.S. Cl. X.R.

83—241, 586, 649